(12) United States Patent
McQueen (10) Patent No.: US 8,571,917 B2
(45) Date of Patent: Oct. 29, 2013

(54) COMMUNITY GENERATED SCENARIOS

(75) Inventor: Mark Thomas McQueen, Nashville, TN (US)

(73) Assignee: Bank of America Corporation, Charlotte, NC (US)

( * ) Notice: Subject to any disclaimer, the term of this patent is extended or adjusted under 35 U.S.C. 154(b) by 620 days.

(21) Appl. No.: 12/617,389

(22) Filed: Nov. 12, 2009

(65) Prior Publication Data

US 2011/0112975 A1    May 12, 2011

(51) Int. Cl.
 *G06Q 30/02*   (2012.01)
(52) U.S. Cl.
 CPC ........................................ *G06Q 30/02* (2013.01)
 USPC ........................................................ 705/7.29
(58) Field of Classification Search
 CPC ................................................ G06Q 30/0201
 USPC ........................................................... 705/7.29
 See application file for complete search history.

(56) References Cited

U.S. PATENT DOCUMENTS

| | | | |
|---|---|---|---|
| 7,437,338 B1* | 10/2008 | Forman et al. ................... | 706/20 |
| 2004/0204980 A1* | 10/2004 | Swedberg et al. .............. | 705/10 |
| 2005/0021461 A1* | 1/2005 | Flake et al. ...................... | 705/40 |
| 2006/0085255 A1* | 4/2006 | Hastings et al. ................. | 705/14 |
| 2007/0005646 A1* | 1/2007 | Dumais et al. ............. | 707/104.1 |
| 2008/0235229 A1* | 9/2008 | Kurien et al. ..................... | 707/9 |

OTHER PUBLICATIONS

Eva Wollenberg, David Edmunds, Louise Buck, Using scenarios to make decisions about the future: anticipatory learning for the adaptive co-management of community forests, Elsevier, Landscape and Urban Planning 47 (2000) 65-77, http://ac.els-cdn.com/S0169204699000717/1-s2.0-S0169204699000717-main.pdf?_tid=1995073e-e8bc-11e2-89b4-00000aacb35e&acdnat=.*

* cited by examiner

*Primary Examiner* — Romain Jeanty
*Assistant Examiner* — Kurtis Gills
(74) *Attorney, Agent, or Firm* — Michael A. Springs; Moore & Van Allen, PLLC; Nicholas C. Russell (57) ABSTRACT

Embodiments of the present invention are generally directed to systems, methods, and computer program products for creating community-generated scenarios that provide a narrative description of the future. In some embodiments, the present invention: scans the Internet for already published scenarios about the future of a particular topic; identifies underlying trends and change drivers in the already published scenarios; scans the Internet for information about the underlying trends and change drivers; publishes, in the form of abstracts, to a community of stakeholders the information about the underlying trends and change drivers; receives and publishes to the individual stakeholders the community's feedback regarding the validity, relevance, and impact of the underlying trends and change drivers with respect to the future of the topic; and provides a forum through which the community of individual stakeholders, in light of the published abstracts and feedback, can collaboratively apply their knowledge to develop community-generated scenarios about the future of the topic.

31 Claims, 6 Drawing Sheets

COMMUNITY GENERATED SCENARIOS

FIELD

In general, embodiments of the present invention relate to systems, methods, and computer program products for determining events that are likely to occur in the future based on community generated feedback.

BACKGROUND

The more a company knows about its customers' vision of the future, the better that company can design and deliver products and services to suit its customers' needs. Also, the more customers know about a company's vision of the future, the better customers can position themselves to take advantage of the company's products and services. Scenario development is a process related to futures studies that is widely used by organizations as a way to document and share their vision of the future and as a way to test strategies against uncertain future developments. The product of scenario development is a scenario, which, as used herein, is a synopsis, written in a narrative format, of the future of a particular topic.

The building blocks of a typical scenario include change drivers, market experiences, and trends. Change drivers are fundamental forces that change the nature of societies and economies across the globe. Change drivers are universal. That is, each change driver is happening all over the world at the same time. Some change drivers may occur independently, while others occur interdependently. When interdependent, changes in the rate and intensity of one change driver impact other change drivers and all forces that the other change drivers affect.

Exemplary change drivers include: commoditization, which is the process by which previously distinguishable products become seen by consumers as interchangeable and differentiated only by price; democratization, which is the process by which autocratic or totalitarian political systems are replaced by a more or less representative or elected government accountable in some way to the will of the populace; demographicalization, which is the process by which changes in the numbers of people, birth and death rates, age distributions etc. emerge as major factors affecting virtually all aspects of life; disintermediation, which is the process by which barriers for direct interaction between consumers of goods and services and the producers or providers of goods and services are removed thus permitting direct interaction and transaction between consumers and producers/suppliers; environmentalization, which is the process through which economic activities are redirected in order to make them more compatible with the growing requirements of economic sustainability; globalization, which is the process by which peoples and economies are being linked together in ways that do not reflect existing geopolitical boundaries; informationalization, which is the process by which virtually all economic and socio-political activities within and between peoples and nations are based upon the development and exchange of information; spiritualization, which is the process of incorporating a holistic spiritual balance in all organizations or activities; technologicalization, which is the process by which technological innovations control change in virtually every aspect of human endeavor by virtue of the increases in human capabilities that they generate; and virtualization, which is the process by which organizations with set locations, staffs, structures, and processes are replaced by organizations that exist largely through temporary functional arrangements not dependent on location or formal structures many functioning via computer-centered networks including the Internet.

A market experience describes how a change driver is experienced in a particular market. Identifying existing market experiences, in addition to market experiences that are predicted to develop in the future, is a key step in studying change in a market. Much can be learned from the comparison of cause, effect and development across market boundaries. Studying markets that have a mature market experience results in a wealth of real life knowledge that is applicable in markets that have a developing market experience.

For illustrative purposes, three exemplary market experiences that describe how an exemplary change driver is experienced will now be provided. In one exemplary market experience, a local government begins contracting out to private companies operations that the government has traditionally performed itself. An underlying change driver for this market experience is virtualization. Here, virtualization is experienced by the process of outsourcing traditional government operations to private companies that exist largely through temporary functional arrangements not dependent on location or formal structures. In a second exemplary market experience, an automobile assembly plant begins exchanging detailed information with an original equipment manufacturer. An exemplary underlying change driver for this market experience is informalization, which is experienced by the development of complex patterns of information exchange between companies in a supply chain. In a third exemplary market experience, a book publishing company offers tailor-made e-books directly to customers over the Internet. An exemplary underlying change driver for this market experience is disintermediation. Here, disintermediation is experienced by the development of companies that are exclusively Internet based and that sell directly to consumers.

Trends are the final building block of scenarios. Trends often exist in groups of similar market experiences and reveal the direction and speed of the ultimate impact of the market experiences. Trends establish a range of impact and a time horizon when applying all the building blocks to the creation or editing of a scenario. A trend cannot exist without a group of market experiences, and a market experience cannot exist without an underlying change driver.

If a company's customers developed scenarios for their respective industries and shared those scenarios with the company, the company would know its customers' vision of the future in their respective industries. Accordingly, the company would have information that would enable it to design and deliver better products and services for its customers. Also, if the company developed scenarios for its vision of the future and shared those scenarios with its customers, then its customers would be able to position themselves to take advantage of the company's future products and services.

Accordingly, there is a need for systems, devices, methods, and other tools that allow companies to create scenarios that provide companies with information about customers' visions of the future and that provide customers with information about companies' visions of the future.

BRIEF SUMMARY OF EMBODIMENTS OF THE INVENTION

The systems, methods, and computer program products of embodiments of the invention create a community-generated scenario that provides a description of the future of a topic, the embodiment comprising: scanning the Internet for at least an already published scenario about the future of the topic; identifying at least an underlying trend in the already published scenario; obtaining from the Internet information about the underlying trend; identifying at least a change driver that drives the trend; obtaining from the Internet information about the change driver that drives the trend; publishing to a community of stakeholders the information about the change drive; receiving from the community of stakeholders feedback regarding how the change driver will affect the topic in the future; monitoring the feedback regarding how the change driver will affect the topic in the future and highlighting contents that differs from the information obtained from the Internet about the change driver; and providing a forum through which the community of stakeholders can develop the community-generated scenario around the highlighted content.

In some embodiments of the invention, the step of scanning the Internet for at least an already published scenario about the future of the topic comprises developing a set of search queries to use for searching the Internet for the published scenario about the topic and creating an algorithm that routinely executed Internet searches using the set of search queries.

In some embodiments of the invention, the step of identifying at least an underlying trend in the already published scenario comprises using a computer program to read the text of the already published scenario and identify keywords or keyword combinations.

In some embodiments of the invention, the step of identifying at least an underlying trend in the already published scenario comprises presenting the already published scenario to the community of stakeholders so that the community of stakeholders can review the already published scenario and identify the underlying trend.

In some embodiments of the invention, the step of obtaining from the internet information about the underlying trend comprises developing a set of search queries to use for searching the Internet for information about the underlying trend and creating an algorithm that routinely executes Internet searches using the set of search queries. The embodiment could contain an additional feature in the step of identifying the change drive that drives the trend comprising: using a computer to read the text of the information obtained from the Internet and identify keywords or keyword combinations. The embodiment could further contain an additional feature in the step of identifying the change drive that drives the trend comprising: presenting the information about the underlying trend to the community of stakeholders so that the community of stakeholders can review the information and identify the change driver.

In some embodiments of the invention, the step of obtaining from the Internet information about the change driver that drives the trend comprises developing a set of search queries that searches the Internet for information about the change driver that drives the trend and creating an algorithm that routinely executes Internet searches using the set of search queries.

In some embodiments of the invention, the step of receiving from the community of stakeholders feedback regarding how the change driver will affect the topic in the future comprises creating a webpage for the change driver and instructing the community of stakeholders fill the webpage with information about the relevance of the change driver to the topic, the impact that the change driver has had and will have on the topic, and the likelihood that the change driver will drive the topic going forward.

In some embodiments of the invention, providing the forum through which the community of stakeholders can develop the community-generated scenario around the highlighted content comprises creating a webpage for the topic, instructing the community of stakeholders to complete a trend section of the webpage with information about how the underlying trend will shape the future of the topic, and instructing the community of stakeholders to complete a change driver section of the webpage with information about how the change driver will shape the future of the topic.

BRIEF DESCRIPTION OF THE DRAWINGS

Having thus described embodiments of the present invention in general terms, reference will now be made to the accompanying drawings, wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention are generally directed to systems, methods, and computer program products for creating scenarios about the future that are likely to occur. In some embodiments, the present invention: scans the Internet for already published scenarios about the future of a particular topic; identifies underlying trends and change drivers in the already published scenarios; scans the Internet for information about the underlying trends and change drivers; publishes, in the form of abstracts, to a community of stakeholders the information about the underlying trends and change drivers; receives from individual stakeholders feedback regarding the validity, relevance, and impact of the underlying trends and change drivers with respect to the future of the topic; publishes the feedback to the entire community of stakeholders; and provides a forum through which individual stakeholders, in light of the published abstracts and feedback, can collaboratively apply their knowledge to develop community-generated scenarios about the future of the topic.

A brief example will now be provided to illustrate embodiments of the present invention. For purposes of this brief example, financial institutions, such as commercial banks, provide treasury products and services to a client-company. A consulting group advises the client-company on how to use the treasury products and services that are provided by the financial institutions to make payments and to collect receipts. In advising the client-company, the consulting group might use the present invention to provide guidance and suggestions calculated to help the client-company more effectively utilize the treasury products and services provided by the financial institution and to meet the client-company's future needs and expectations.

More particularly, in this brief example, the consulting group uses the present invention to facilitate community-generated scenarios that provide a synopsis of the future of particular topics within the broad framework of treasury products and services. For purposes of this brief example, the particular topic is mobile payment services, which include, for example, services that enable the client-company to collect receipts from its customers via Internet payments and SMS-based payments. The consulting group can leverage information provided in these community-generated scenarios to implement proactive measures that position the client-company in a manner that enables the client-company to avoid future problems with its mobile payment services, which are provided by the financial institution, and to take advantage of future developments in mobile payment services.

Figure 1:
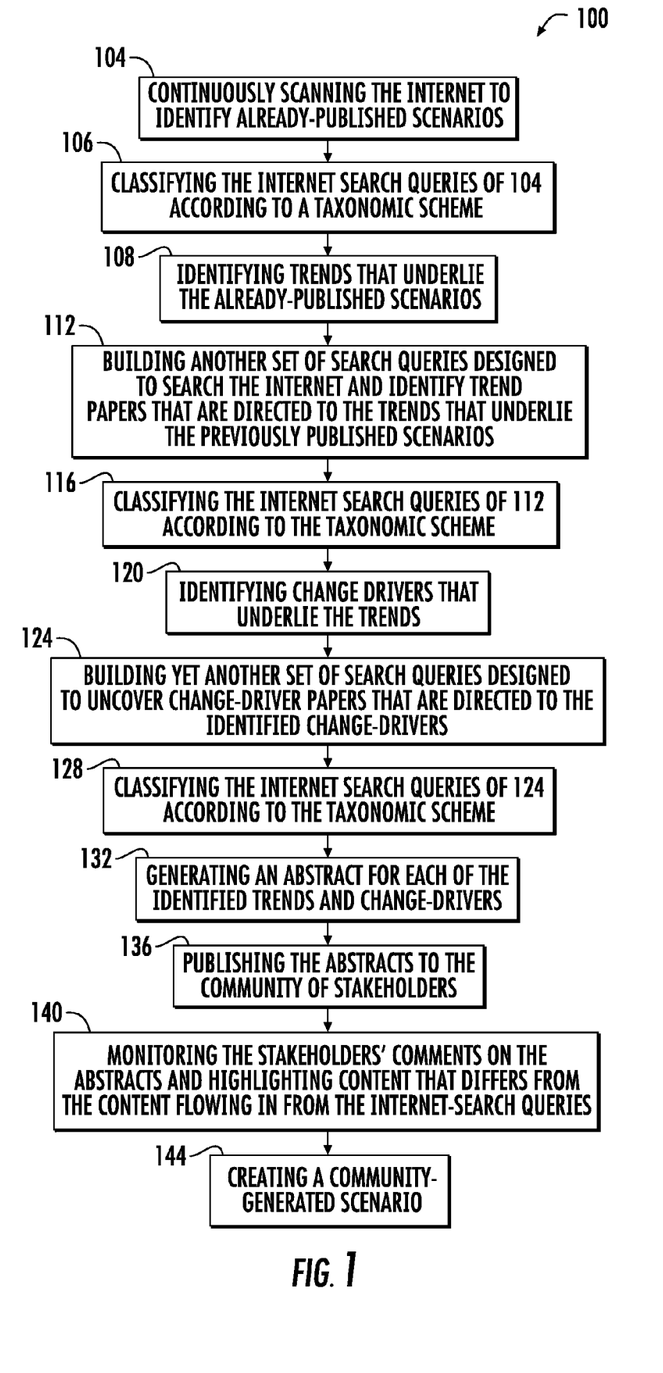
FIG. 1 is a flow diagram illustrating a brief-exemplary process for creating community-generated scenarios about the future of mobile payment services, in accordance with an embodiment of the present invention.

This brief example will now be described in more detail with reference to FIG. 1, which provides a flow diagram illustrating a brief-exemplary process 100 for creating community-generated scenarios about the future of mobile payment services. As represented by block 104, the brief-exemplary process 100 generally begins with continuously scanning the Internet to identify already-published scenarios about the future of mobile payment services and presenting the already-published scenarios to a community of stakeholders. To accomplish the task of identifying already published scenarios, Internet-search queries are developed that search the Internet for already published scenarios about mobile payment services. For example, search strings are developed and repeatedly executed in an Internet search engine to uncover scenarios about the future of mobile payment services that are published on websites, blogs, traditional news sites, academic journals, books, videos, patents and published patent applications, etc.

Multiple search strings are developed so as to locate scenarios about various aspects of mobile payment services. One search string may uncover already published scenarios about a particular subtype of mobile payment services, whereas another search string may uncover already published scenarios about a different subtype. For example, some search strings may uncover already published scenarios about SMS-based transactional payments, other search strings may uncover already published scenarios about direct mobile billing, and still other search strings may uncover already published scenarios about mobile web payments. All of these subtypes fall within the particular topic of mobile payment services, which falls within the broader topic of treasury products and services.

After a reliable set of search queries have been developed and already published scenarios are presented to the community of stakeholders, the brief-exemplary process 100 involves classifying the search queries, including the content of the already published scenarios uncovered by the search queries, according to a taxonomic scheme, as represented at block 106. The community of stakeholders over time creates the taxonomic scheme for classifying the search queries and associated content. For example, individual stakeholders collaboratively create and manage tags that annotate and categorize content uncovered by each of the search queries. In this brief example, the taxonomic scheme is a traditional parent-child hierarchical scheme consisting of one parent category having the three child categories appended thereto. The parent category is mobile payment services generally. The three child categories are: (1) SMS-based transactional payments; (2) direct mobile billing; and (3) mobile web payments.

Each of the search queries is classified as being a search query that uncovers already published scenarios having content associated with the parent category and/or one or more of the three child categories. This taxonomic scheme can evolve over time using the collective wisdom of the individual stakeholders. For example, the stakeholders can create new child categories for search queries that uncover content that does not fall into one of the above-mentioned child categories but is related to the parent category. Further, for example, the stakeholders can create grandchild categories for each of the child categories. Likewise, the stakeholders can create additional parent categories for search queries that uncover content that is related to treasury services and product but not to the above-mentioned parent category of mobile payment services, and child and grandchild categories can be appended from any new parent categories. This evolving taxonomic scheme, which is sometimes referred to as "Folksonomy", allows an orderly structure but one that recognizes the opportunity to evolve as new content emerges that does not fit within the current structure.

As represented by block 108, the brief-exemplary process 100 further involves identifying trends that underlie the previously published scenarios, which were uncovered by the search queries. To do so, the stakeholders review the previously published scenarios to identify trends that underlie the scenarios and then submit feedback indicating the trends that underlie the scenarios. Next, as represented by block 112, the brief-exemplary process 100 involves building another set of search queries designed to search the Internet and identify trend papers that are directed to the trends that underlie the previously published scenarios. These search queries are designed to identify published trend papers, not scenarios, about the underlying trends. It should be understood that, for purposes of this brief example, the trend papers identified by this set of search queries are not limited to any of the above-mentioned parent or child categories. In fact, the trend papers identified by this set of search queries are not limited to treasury products and services. Instead, the trend papers can describe the trends in other, unrelated contexts. These trend papers give the community of shareholders valuable information about how the trends are affecting industries in areas other than treasury products and services.

Once the search queries that uncover trend papers have been designed, the brief-exemplary process 100, as represented by block 116, involves applying the search queries that uncover trend papers to the taxonomic scheme that was developed around the search queries that identify previously presented scenarios. As such, the taxonomy accounts for search queries that identify previously presented scenarios and search queries that identify trend papers. Within the taxonomy, search queries that identify trend papers are tagged as trend-paper search queries and any content from the trend papers is tagged as trend-paper content. Likewise, search queries that identify scenarios are tagged as scenario search queries and any content from the scenarios is tagged as scenario content.

Next, as represented by block 120, the brief-exemplary process 100 involves presenting the trend papers to the community of stakeholders so that individual stakeholders can review the trend papers and identify change drivers that underlie the trends that are actually causing trends to take place. As an example, a particular change driver in mobile payment services is technologicalization, which manifests itself in the form of recent advances in wireless technologies that have led to lower costs and improved capability.

After the community of shareholders has identified underlying change drivers, the brief-exemplary process 100 involves building yet another set of search queries designed to uncover change-driver papers that are directed to the identified change drivers, as represented by block 124. The search queries, along with the content of any associated change-driver papers, are then applied to the previously described taxonomic scheme and tagged as change driver search queries and any content from the change-driver papers is tagged as change-driver content, as represented by block 128.

Next, as represented at block 132, the brief-exemplary process 100 involves generating an abstract for each of the identified trends and/or change drivers, where each abstract provides a summary of the trend or change driver. The abstracts are organized according to the existing taxonomic scheme. As represented at block 136, the brief-exemplary process 100 further involves publishing the abstracts to the community of stakeholders in the form of a blog-like webpage that includes template, which instructs the community to discuss the trend or change driver disclosed in the abstract. For example, for the abstract that summarizes technologicalization that resulted in advances in wireless technology, the blog template instructs individual stakeholders to discuss the relevance of the advancements in wireless technology to mobile payment services, the impact that the advancements in wireless technology have had and will have on mobile payment services, and/or likelihood that the advancements in wireless technology will drive mobile payment services going forward. As discussed in more detail below, to publish the abstracts, instead of or in addition to a blog-like webpage, a wiki page may be created for each abstract. The wiki pages could be hyperlinked together to form a wiki, which would essentially be a database of abstracts. These wiki pages that publish abstracts could be hyperlinked to wiki pages that publish scenarios and/or other sorts of information, such as information about trends, change drivers, and market experiences.

As represented at block 140, the brief-exemplary process 100 involves monitoring the stakeholders' comments on the abstracts and highlighting content that differs from the content flowing in from the Internet-search queries. In an embodiment, this is accomplished by content flow algorithms similar to those used to flag significant content-flow changes in the abstracts that would then inform changes to be made to the scenarios. The highlighted content represents new content that will be included in the community-generated scenarios about the future of mobile payment services. As represented at block 144, the brief-exemplary process 100 involves creating a community-generated scenario about the future of mobile payment services. For example, the community-generated scenarios consist of at least two sections: change drivers and trends. The change driver section identifies the change drivers that underlie mobile payment systems and discusses how those change drivers will affect the future of mobile payment systems. Similarly, the trend section identifies the trends that underlie mobile payment systems and discusses how those trends will affect the future of mobile payment systems.

In operation, a webpage having a template for creating a scenario is presented to the community of stakeholders. Individual stakeholders access the webpage and—relying on the published abstracts, including the highlighted content therein, which summarize the trends and change drivers that underlie mobile payment services—collaboratively fill out the template to create the community-generated scenario. For example, the template may include a list of questions to be answered by the community of stakeholders. The answers to these questions may be organized and presented according to the template to create the community-generated scenario.

Figure 2:
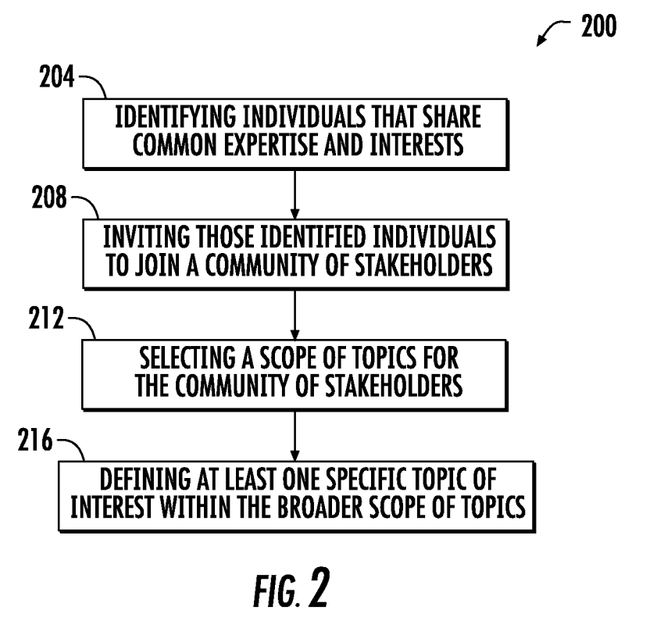
FIG. 2 is a flow diagram illustrating a process for building a community of stakeholders that participate in creating scenarios about the future of selected topics, in accordance with an embodiment of the present invention.

Embodiments of the present invention will now be discussed in more detail with reference to FIGS. 2-5. FIG. 2 is a flow diagram that provides a process 200 for building a community of stakeholders that participate in creating scenarios about the future of selected topics. As represented by block 204, the process 200 generally begins with identifying individuals that share common expertise and interests. These individual may belong to the same professional or civic organization, the same Internet social network, or the same product affinity group, or these individuals may be individuals with similar qualifications and backgrounds. As represented by block 208, the process 200 further involves inviting those identified individuals to join a community of stakeholders. This involves developing and executing a promotional campaign to generate awareness and interest in the community of stakeholders, or, if the community of stakeholders is to include intercompany stakeholders, identifying the appropriate participants.

As represented by block 212, the process 200 involves selecting a scope of topics for the community of stakeholders. Then, the process 200 involves defining at least one specific topic of interest within the broader scope of topics, as represented by block 216. It should be appreciated that the community self-selects the at least on specific topic of interest. This topic of interest will be the focal point of the predictive scenarios that are ultimately created by the community of stakeholders. For example, in the brief example described with reference to FIG. 1, the scope of the topic was treasury products and services, and the topic of interest was mobile payment services.

Figure 3:
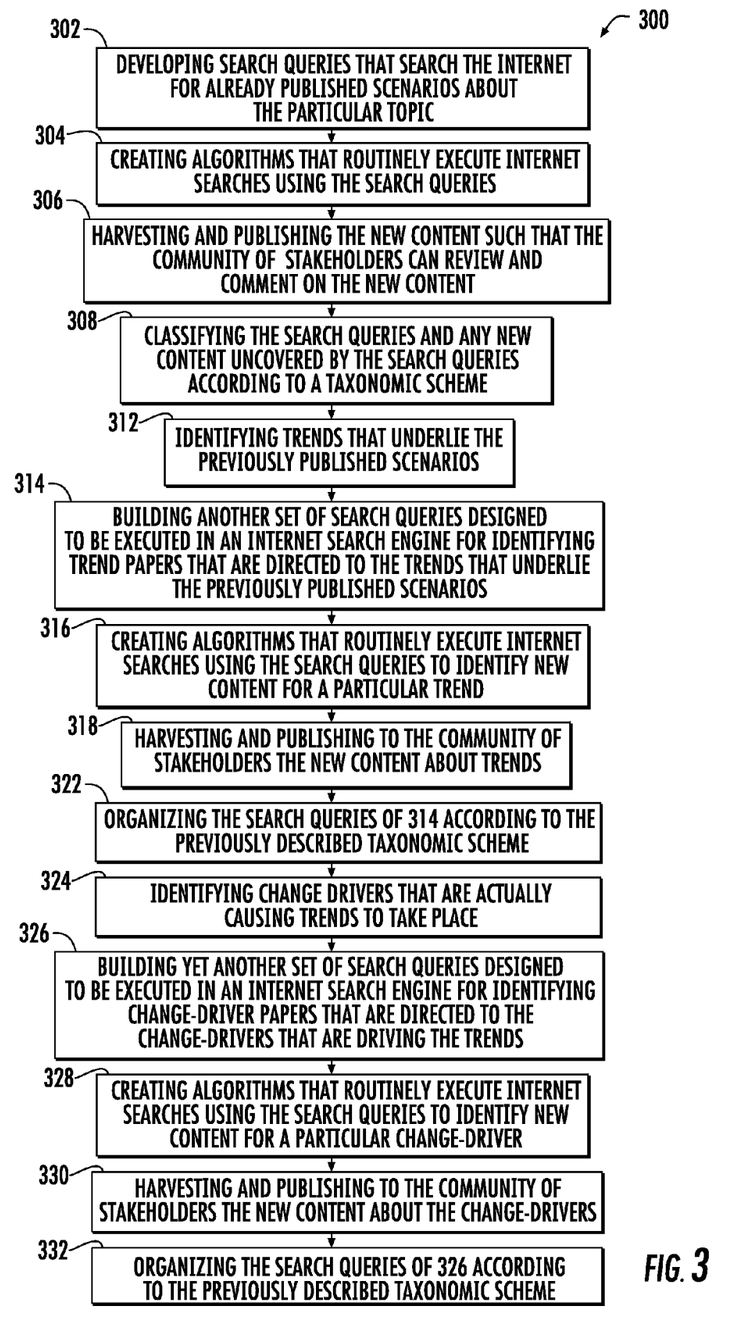
FIG. 3 is a flow diagram illustrating a process for performing continuous environmental scans to search the Internet to identify previously published scenarios about a particular topic and to identify trends and change drivers underlying the previously published scenarios, in accordance with an embodiment of the present invention.
Figure 4:
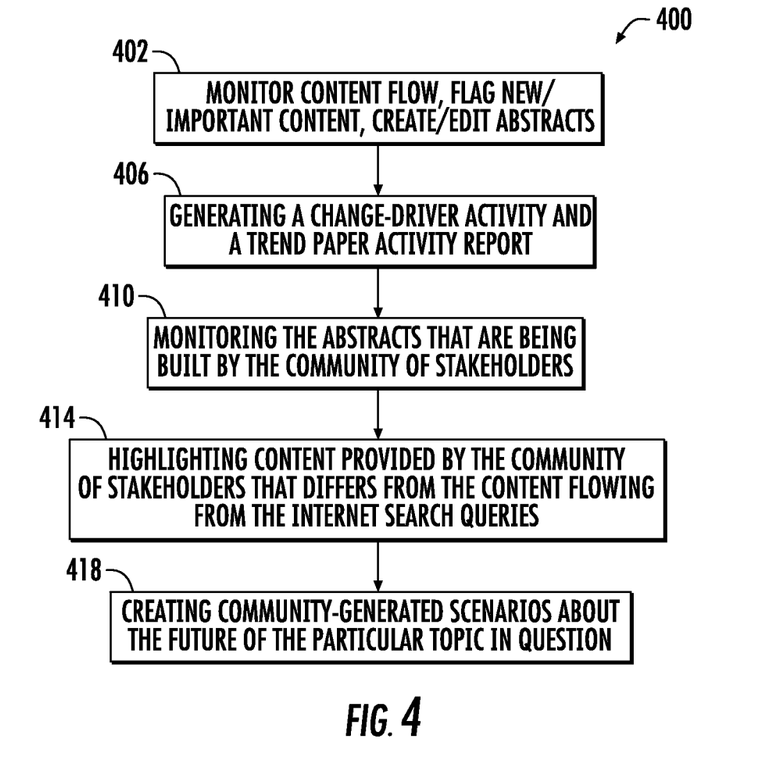
FIG. 4 is a flow diagram illustrating a process for leveraging the trends and change drivers that were identified by the continuous environmental scans executed by the process of FIG. 3 to generate predictive scenarios about the future, in accordance with an embodiment of the present invention.

FIG. 3 is a flow diagram illustrating a process 300 for performing continuous environmental scans to search the Internet to identify previously published scenarios about a particular topic and to identify trends and change drivers underlying the previously published scenarios. FIG. 4 is a flow diagram illustrating a process 400 for leveraging the trends and change drivers that were identified by the continuous environmental scans of FIG. 3 to generate predictive scenarios about the future. In some embodiments, processes 300 and 400 are continuous loop processes. Process 300 continuously scans the Internet searching for new content in the previously published scenarios that may provide new information about relevant trends and change drives. Process 400 continuously leverages the new information resulting from process 300 to refine and add new information to the scenarios. Accordingly, the predictive scenarios generated by the present invention are dynamic. The scenarios are continuously evolving and become more refined over time.

Referring now to FIG. 3, as represented by block 302, the process 300 generally begins with developing search queries that search the Internet for already published scenarios about the particular topic, where, as discussed above, a scenario is a narrative description of the future of the particular topic. For example, search strings are developed and executed in an Internet search engine to uncover scenarios that are published on websites, blogs, traditional news sites, academic journals, books, videos, patents and published patent applications, etc. According to some embodiments, the search queries are developed by individual stakeholders. In other embodiments, community-generated search queries are submitted by individual stakeholders and accumulated by a system administrator for approval. If approved, the search queries are added to the set of search queries for relevant topic. In other embodiments, algorithms are provided that generate search queries using keywords and keyword combinations that are related to the particular topic of interest.

The process 300, as indicated at block 304, further involves creating algorithms that routinely execute Internet searches using the search queries. These algorithms are designed to review the results of the Internet searches and identify new content, where new content includes previously-published scenarios that had not been uncovered by previous search queries and amendments to previously-published scenarios that have already been uncovered. Then, as indicated by block 306, the process 300 involves harvesting and publishing the new content such that the community of stakeholders can review and comment on the new content. As represented at block 308, the process 300 further involves classifying the search queries and any new content uncovered by the search queries according to a taxonomic scheme. According to some embodiments, the community of stakeholders over time creates the taxonomy for classifying the search queries and the content resulting from execution of those search queries. For example, to derive the system of classification, the stakeholders collaboratively create and manage tags to annotate and categorize content for each of the search queries and associated content.

According to an embodiment, aspects of the taxonomy are based around the factors used in a well-known business analysis, which is sometimes referred to as the STEEP analysis. The factors used in the STEEP analysis are: societal factors; technological factors; economic factors; environmental factors; and political factors. When classifying search queries according to a taxonomic scheme based on the STEEP factors, the search queries are labeled as being one or more of the STEEP factors. This taxonomy enables comparison across topics. For example, scenarios that are directed to one topic may share common trends and/or change drivers with scenarios that are directed to other topics. Accordingly, a taxonomic scheme based on the STEEP factors enables the community of stakeholders to learn how a particular trend or change driver affected one topic, and apply that information to predict how that trend or change driver will impact the topic in question.

As represented by block 312, the process 300 further involves identifying trends that underlie the previously published scenarios. To do so, for example, technology is applied to read the actual text of the scenarios and highlight trends based on, for example, keywords and combinations of keywords. In some embodiments, these machine-identified trends are presented to the community of stakeholders for confirmation of whether the machine has properly identified something as a trend. Also for example, to identify trends, the scenarios are presented to the community of stakeholders such that the stakeholders can review the scenarios and manually identify trends in the scenarios.

Next, as represented by block 314, the process 300 involves building another set of search queries designed to be executed in an Internet search engine for identifying trend papers that are directed to the trends that underlie the previously published scenarios. The trend papers identified by this set of search queries can be directed to subject matter beyond that of the particular topic in question. Here, the trends are of interest, not the particular topic. According to some embodiments, these search queries are developed by individual stakeholders. In some embodiments, these community-generated search queries are submitted to a system administrator for approval. If approved, the search queries are added to the set of search queries for relevant topic.

The process 300, as indicated at block 316, further involves creating algorithms that routinely execute Internet searches using the search queries to identify new content for a particular trend. Then, as indicated by block 318, the process 300 involves harvesting and publishing to the community of stakeholders the new content about a particular trend. As search queries that identify trend papers are developed, the process 300, as represented by block 322, involves organizing the search queries according to the previously described taxonomic scheme. Within the taxonomy, search queries that uncover trend papers are tagged as trend paper search queries, and search queries that uncover scenarios are tagged as scenario search queries.

As represented by block 324, the process 300 further involves identifying change drivers that are actually causing trends to take place. To do so, for example, software is used to read the text of the trend papers and highlight change drivers based on, for example, keywords and combinations of keywords. In some embodiments, these machine-identified change drivers are presented to the community of stakeholders for confirmation of whether the machine correctly identified something as a change driver. Also for example, to identify change drivers, the trend papers are presented to the community of stakeholders such that the stakeholders can review the trend papers and manually identify the change driver or change drivers that are driving the trends.

Next, as represented by block 326, the process 300 involves building yet another set of search queries designed to be executed in an Internet search engine for identifying change driver papers that are directed to the change drivers that are driving the trends. Like trend papers, the change driver papers uncovered by this set of search queries can be directed to subject matter beyond that of the particular topic. Here, the change drivers are of interest, not the particular topic of interest or the trends. According to some embodiments, these change driver search queries are developed by individual stakeholders. In some embodiments, these community-generated search queries are submitted to a system administrator for approval. If approved, the search queries are added to the set of search queries for particular change driver.

The process 300, as indicated at block 328, further involves creating algorithms that routinely execute Internet searches using the search queries to identify new content for a particular change driver. Then, as indicated by block 330, the process 300 involves harvesting and publishing to the community of stakeholders the new content about the particular change driver. As search queries that identify change driver papers are developed, the process 300, as represented by block 332, involves organizing the search queries according to the previously described taxonomic scheme. Within the taxonomy, search queries that uncover change driver papers are tagged as change driver search queries, search queries that uncover trend papers are tagged as trend paper search queries, and search queries that uncover scenarios are tagged as scenario search queries.

In operation, the process 300 continuously loops and, accordingly, continuously creates, refines, and executes search queries that continuously uncover new content. And the taxonomy continuously evolves around the new content. This new content includes new scenarios, trend papers, and change driver papers, or new amendments to scenarios, trend papers, and change driver papers. From new scenario content, the process 300 uncovers new trends and change drivers. From new trend content, the process 300 uncovers new change drivers.

Referring now to FIG. 4, as represented by block 402, the process 400 generally begins with monitoring the content flow and generating and editing abstracts. For example, at block 402, the process 400 monitors the Internet for activity related to the identified trends and change drivers. Any new and/or important content is flagged. The community can then review the flagged content. Then, the community can edit existing abstracts to reflect the flagged content or, if no relevant abstracts already exist, create new abstract(s) for the flagged content. It should be appreciated that an abstract could provide an executive summary of the flagged content, such as a particular trend or change driver or a particular aspect of a trend or change driver. According to some embodiments, technology is applied to facilitate the creation of an abstract for each trend and change driver. For example, an application recognizes when a new trend or change driver is uncovered and creates a blog-like webpage and/or wiki page for the new trend or change driver. The blog-like webpage or wiki page, which is organized according to the existing taxonomy, includes a template for creating an abstract. Individual stakeholders locate the blog-type webpage or wiki page through the taxonomy and then access the blog-like webpage or wiki page and build out the abstract. It should be appreciated that it is not necessary to build out a new abstract each time. Instead, prior abstracts can be modified to reflect the new content.

For example, stakeholders build out the abstract for a trend or change driver in the context of the selected topic. Referring to the brief example provided with reference to FIG. 1, where the selected topic is mobile payment services and where the abstract is directed to the change driver represented by advances in wireless technology, the template provided on the blog-like webpage or wiki page may instruct the community of stakeholders to build out the abstract in an organized manner. For example, the template could instruct stakeholders to discuss the relevance of advancements in wireless technology to mobile payment services, the impact advancements in wireless technology has had and will have on mobile payment services, and/or likelihood that advancements in wireless technology will drive mobile payment services going forward. Abstracts are continuously updated by the community of stakeholders as the process 300 uncovers and publishes new content and as more and more individual stakeholders participate.

According to an embodiment, instead of or in addition to generating and publishing an abstract, the process 400 involves generating a change driver activity and a trend paper activity report at block 406. According to an embodiment, the change driver/trend activity report is a continuously updated report that lists the change drivers and trends identified by the process 300. Referring again to the brief example provided with reference to FIG. 1, suppose, pursuant to an embodiment of process 300, one-hundred search queries are being executed in an Internet search engine for monitoring the flow of content about the change drivers and trends that were identified for mobile payment services. Each day, each search query uncovers new content. To generate the change driver activity report, the process 400, at block 406, flags the search queries that uncover the most new content. These flagged search queries are included on the change driver/trend activity report. In some embodiments, the community of stakeholders reviews the new content flowing from the flagged search queries and, as represented by block 402, generates new abstracts and updates existing abstracts in light of the new content.

According to an embodiment, each of the stakeholders, using the taxonomy as a navigation tool, can identify the topics that he or she wants to track. In this case, each stakeholder receives a change driver/trend activity report that includes the flagged search queries, if any, for each topic that the particular stakeholder is tracking. This enables the stakeholder to obtain continuous information for the topics he or she is interested in. Each stakeholder's report is customized to his or her taxonomy.

Next, as represented at block 410, the process 400 involves monitoring the abstracts that are being built by the community of stakeholders. Here, for example, the frequency and content of stakeholder contributions to abstracts are monitored. Then, as represented at block 414, the process 400 involves highlighting content provided by the community of stakeholders that differs from the content flowing from the Internet search queries. Highlighted content represents new content, which is content that the community of stakeholders is generating by applying its knowledge to content that is being culled from the Internet by process 300.

As represented at block 418, the process 400 further involves creating community-generated scenarios about the future of the particular topic in question. According to some embodiments, the community-generated scenarios consist of at least two sections: change drivers and trends. The change driver section identifies the change drivers that underlie the particular topic and describes how those change drivers will affect the future of the particular topic. Similarly, the trend section identifies the trends that underlie particular topic and describe how those trends will affect the future of the particular topic. According to an embodiment, the scenarios are created in a webpage, such as a wiki page.

As used here, the term "wiki page" refers to a type of webpage that enables documents to be written collaboratively using a web browser. A single page in a wiki website is referred to as a "wiki page", while the entire collection of pages, which are interconnected by hyperlinks, is referred to herein as a "wiki". A wiki is essentially a database for creating, browsing, and searching through information. Accordingly, in some embodiments, a wiki page is created for each trend, change driver, market experience and/or scenario, and all of the wiki pages are interconnected to create a wiki. According to some embodiments, each wiki page is written according to a structured format that includes specific components. For example, when collaborating to write a wiki page for a scenario, individual stakeholders access the wiki page and—relying on the published abstracts, including the highlighted content therein, which summarize the trends and change drivers that underlie the particular topic—collaboratively create the community-generated scenario in the wiki page.

According to some embodiments, a rating scale is provided that indicates the completeness of each scenario and which sections of each scenario need to be built out in order to complete the scenario template. According to an embodiment, the community writes a set of scenarios for each topic. For example, the community writes four versions of a scenario about the future of a particular topic. One scenario is the most extreme version of the scenarios. In this scenario, the change drivers and trends have a significant future impact on the topic. The additional scenarios are gradually less extreme and the fourth scenario predicts that the identified change drivers and trends will have no impact on the topic.

Figure 5:
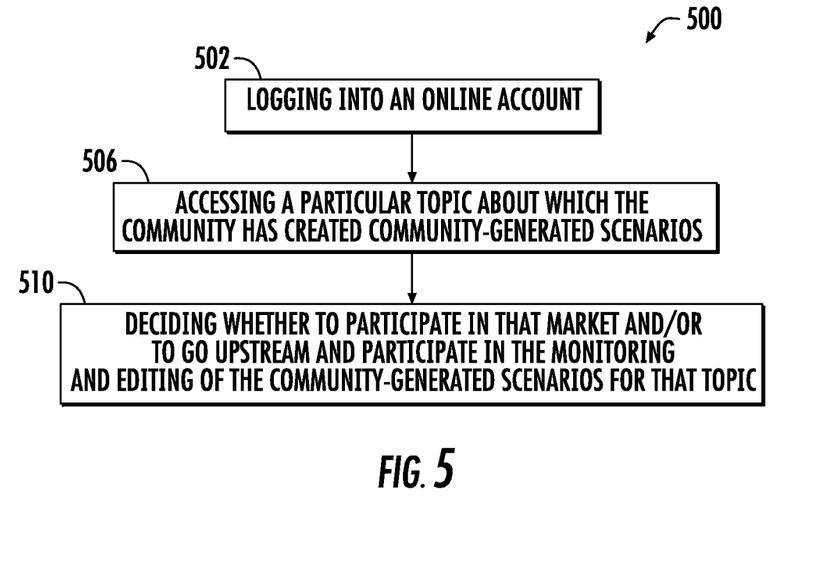
FIG. 5 is a flow diagram illustrating a process for trading scenarios in a predictive market, in accordance with an embodiment of the present invention.

Referring now to FIG. 5, which provides a flow diagram illustrating a process 500 for trading scenarios in a predictive market. According to some embodiments, each stakeholder has an account in which he or she can trade community-generated scenarios based on which scenarios he or she believes are the most relevant and likely to actually happen.

For example, in the embodiment where multiple versions of a scenario exist for a particular topic, stakeholders trade based on which version they believe will most likely occur in the future. As represented by block 502, the process 500 generally begins with the stakeholder logging into an online account and then, as represented by block 506, accessing a particular topic about which the community has created community-generated scenarios. The stakeholder is directed to a webpage that presents the four scenarios and the value that the predictive market placed on each of those scenarios. Then, as represented by block 510, the stakeholder decides whether to participate in that market and/or to go upstream and participate in the monitoring and editing of the community-generated scenarios for that topic.

The predictive market has the effect of assigning values to each scenario. Each value reflects the community's assessment of whether a particular scenario accurately predicts the future. Accordingly, a company that is attempting to solicit its customers' visions of the future can review the scenarios that are relevant its lines of business. The business can identify the scenarios on which the predictive market places a high value and then begin to develop its products and services around those scenarios. This will enable the company to anticipate its customers' needs. Likewise, a customer that is interested in taking advantage of a company's products and services can access the predictive market and identify scenarios about topics that relate to the company's products and services. The customer can review the scenarios on which the predictive market places a high value, and then begin to position itself to take advantage of the products and services described in those scenarios.

Figure 6:
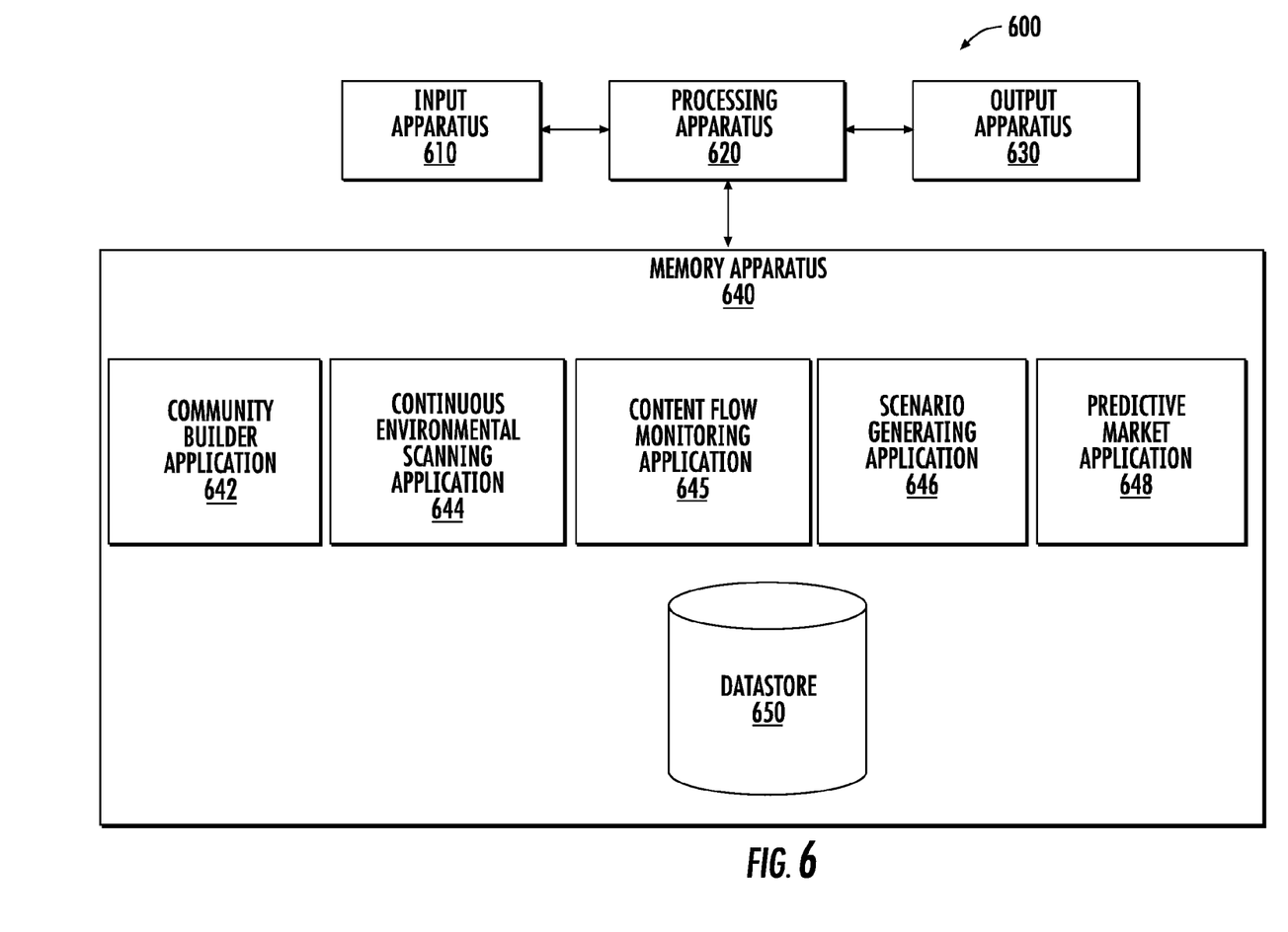
FIG. 6 is a block diagram illustrating a system and environment for executing the processes disclosed in FIGS. 1-5, in accordance with an embodiment of the present invention.

FIG. 6 provides a block diagram of a system 600 generally configured to execute the processes of FIGS. 1-5 for creating community-generated scenarios about the future, in accordance with one embodiment of the present invention. The system 600 generally includes an input apparatus 610, an output apparatus 630, and a memory apparatus 640 operatively coupled to a processing apparatus 620.

As used herein, the term apparatus refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

Furthermore, it will be understood by one of ordinary skill in the art in view of this disclosure that, although FIG. 6 illustrates the input apparatus 610, output apparatus 630, memory apparatus 640, and processing apparatus 620 as separate blocks in the block diagram, these separations may be merely conceptual. In other words, in some instances, the input apparatus 610, for example, is a separate and distinct device from the processing apparatus 620 and the memory apparatus 640 and therefore may have its own processor, memory, and software. In other instances, however, the input apparatus 610 is directly coupled to or integral with at least one part of the processing apparatus 620 and at least part one part of the memory apparatus 640 and includes the input hardware used by the processing apparatus 620 when the processing apparatus 620 executes user input software stored in the memory apparatus 640.

In one embodiment, the system 600 is entirely contained within a user terminal, such as a personal computer or mobile terminal, while, in other embodiments, the system 600 includes a central computing system, one or more network servers, and one or more user terminals in communication with the central computing system via a network and the one or more network servers. FIG. 6 is intended to cover both types of configurations as well as other configurations that will be apparent to one of ordinary skill in the art in view of this disclosure.

The input apparatus 610 includes hardware and/or software for receiving input into the system 600. For example, in some embodiments, the input apparatus 610 includes a network interface configured to receive electronic input from other devices in a network. The network may include a direct connection between a plurality of devices, a global area network such as the Internet, a wide area network such as an intranet, a local area network, a wireline network, a wireless network, a virtual private network, other types of networks, and/or a combination of the foregoing. In some embodiments, the input apparatus 610 includes one or more user input devices, such as a keyboard, keypad, mouse, microphone, touch screen, touch pad, controller, and/or the like. In one embodiment, the input apparatus 610 includes a user terminal, or at least the user input devices of a user terminal, where the user terminal is configured to be used by an employee of the facility owner.

The output apparatus 630 includes hardware and/or software for communicating output from the system 600. For example, in some embodiments, the output apparatus 630 includes a network interface configured to send electronic output to other devices in a network. In some embodiments, the output apparatus 630 includes one or more user output devices, such as a display (e.g., a monitor, liquid crystal display, one or more light emitting diodes, etc.), a speaker, a tactile output device, a printer, and/or other sensory devices that can be used to communicate information to a person. In one embodiment, the output apparatus 630 includes a user terminal, or at least the user output devices of a user terminal, where the user terminal is configured to be used by an employee of the facility owner or agent.

The processing apparatus 620 includes circuitry used for implementing communication and logic functions of the system 600. For example, the processing apparatus 620 may include a digital signal processor device, a microprocessor device, and various analog-to-digital converters, digital-to-analog converters, and other support circuits. Control and signal processing functions of the system 600 are allocated between these devices according to their respective capabilities. The processing apparatus 620 may include functionality to operate one or more software programs based on computer-readable instructions thereof, which may be stored in the memory apparatus 640. In one embodiment of the invention, the memory apparatus 640 includes a community builder application 642, a continuous environmental scanning application 644, a content flow monitoring application 645, a scenario generating application 646, and a predictive market application 648 stored therein for instructing the processing apparatus 640 to perform one or more operations of the processes 200-500 respectively described in FIGS. 2-5. Some embodiments of the invention may include other computer programs stored in the memory apparatus 640.

In general, the memory apparatus 640 is communicatively coupled to the processor 620 and includes computer-readable storage medium for storing computer-readable program code and instructions, as well as datastores containing data and/or databases. More particularly, the memory apparatus 640 may include volatile memory, such as volatile Random Access Memory (RAM) including a cache area for the temporary storage of data. The memory apparatus 640 may also include non-volatile memory that can be embedded and/or may be removable. The non-volatile memory can, for example, comprise an EEPROM, flash memory, or the like. The memory apparatus 640 can store any of a number of pieces of information and data used by the system 600 to implement the functions of the system 600 described herein.

In the illustrated embodiment, the memory apparatus 640 includes a datastore 650 containing Internet search queries and associated content, abstracts, and community-generated scenarios, all of which are organized according to the above-described taxonomy.

As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, each of the community builder application 642, continuous environmental scanning application 644, scenario generating application 646, and predictive market application 648 includes computer-readable instructions for instructing the processing apparatus 120 and/or other devices to perform one or more of the functions described herein.

As will be appreciated by one of ordinary skill in the art in view of this disclosure, the present invention may be embodied as a method, system, apparatus, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-readable medium having computer-usable program code embodied in the medium.

Any suitable computer-readable medium may be utilized, including a computer-readable storage medium and/or a computer-readable signal medium. The computer-readable storage medium may be, for example but not limited to, an electronic, magnetic, optical, electromagnetic, infrared, or semiconductor storage system, apparatus, or device. More specific examples of the computer-readable storage medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. A computer-readable signal medium may include a propagated data signal with computer program instructions embodied therein, for example, in base band or as part of a carrier wave. Such a propagated signal may take any of a variety of forms, including, but not limited to, electro-magnetic, optical, or any suitable combination thereof. In the context of this document, a computer-readable medium may be any medium that can contain, store, communicate, and/or transport the program for use by or in connection with the instruction execution system, apparatus, or device.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations, and/or combinations of blocks in the flowchart illustrations, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart block(s).

The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart block(s). Alternatively, computer program implemented steps or acts may be combined with operator or human implemented steps or acts in order to carry out an embodiment of the invention.

What is claimed is:

1. A method for creating a community-generated scenario that provides a description of the future of a topic, the method comprising:

Scanning, via a computer processing device, the Internet continuously for at least an already published scenario about the future of the topic, wherein at least a portion of the topic includes treasury products or services;

identifying at least an underlying trend in the already published scenario, wherein the underlying trend causes the already published scenario to take place;

developing a second scan of the underlying trend in the already published scenario using the Internet, wherein the second scan identifies trend papers associated with both treasury products related to the published scenario and trend papers related to external industries that affect the underlying trend in the already published scenario;

identifying at least a change driver from the trend papers content, wherein the change driver acts as a derivative force on the underlying trend;

developing a third scan of the Internet, wherein the third scan identifies change driver papers that are directed to the identified change drivers, wherein the change driver papers provide information pertaining to the derivative effect of the change driver on the underlying trends of both the treasury products and the external industries;

publishing to a community of stakeholders information about the change driver;

receiving from the community of stakeholders feedback regarding how the change driver will affect the topic in the future;

monitoring, via a computer processing device, the feedback regarding how the change driver will affect the topic in the future and highlighting content that differs from the information obtained from the Internet about the change driver; and providing a forum through which the community of stakeholders develop the community-generated scenario around the highlighted content.

2. The method of claim 1, wherein the step of scanning the Internet for at least an already published scenario about the future of the topic comprises:

developing a set of search queries to use for searching the Internet for the published scenario about the topic; and creating an algorithm that routinely executes Internet searches using the set of search queries.

3. The method of claim 1, wherein the step of identifying at least an underlying trend in the already published scenario comprises:

using a computer program to read the text of the already published scenario and identify keywords or keyword combinations.

4. The method of claim 1, wherein the step of identifying the underlying trend in the already published scenario comprises:

presenting the already published scenario to the community of stakeholders so that the community of stakeholders can review the already published scenario and identify the underlying trend.

5. The method of claim 1, wherein the step of developing a second scan of the underlying trend using the Internet to identify trend papers associated with the underlying trend, wherein the trend papers allow for identification of at least a change driver that drives the trend comprises:

developing a set of search queries to use for searching the Internet for trend papers associated with treasury products that relate to the published scenario; and developing a second set of search queries to use for searching the Internet for trend papers related to external industries that affect the underlying trend in the already published scenario; and creating an algorithm that routinely executes Internet searches using the two sets of search queries.

6. The method of claim 5, wherein allowing for the identification of at least the change driver that drives the trend comprises:

using a computer program to read the text of the information obtained from the Internet and identify keywords or keyword combinations.

7. The method of claim 5, wherein allowing for the identification of at least the change driver that drives the trend comprises:

Presenting the information about the underlying trend to the community of stakeholders so that the community of stakeholders can review the information and identify the change driver.

8. The method of claim 1, wherein the step of obtaining from the Internet information about the change driver that drives the trend comprises:

developing a set of search queries that searches the Internet for information about the change driver that drives the trend; and creating an algorithm that routinely executes Internet searches using the two sets of search queries.

9. The method of claim 1, wherein the step of receiving from the community of stakeholders feedback regarding how the change driver will affect the topic in the future comprises:

creating a webpage for the change driver; and instructing the community of stakeholders fill the webpage with information about the relevance of the change driver to the topic, the impact that the change driver has had and will have on the topic, and the likelihood that the change driver will drive the topic going forward.

10. The method of claim 1, wherein providing the forum through which the community of stakeholders can develop the community-generated scenario around the highlighted content comprises:

creating a webpage for the topic;

instructing the community of stakeholders to complete a trend section of the webpage with information about how the underlying trend will shape the future of the topic; and instructing the community of stakeholders to complete a change driver section of the webpage with information about how the change driver will shape the future of the topic.

11. A method of developing a scenario about the future of a particular topic, the method comprising:

developing, via a computer processing device, a first set of Internet search queries for continuous scanning of the Internet, wherein the search queries are designed to locate on the Internet at least an already-published scenario about the particular topic, wherein at least a portion of the topic includes treasury products or services;

analyzing the already published scenario to identify at least a trend that underlies the already-published scenario, wherein the underlying trend causes the already published scenario to take place;

developing a second set of Internet search queries designed to locate trend papers on the Internet containing information about the underlying trend, wherein the second set of Internet searches identifies trend papers associated with both treasury products related to the published scenario and trend papers related to external industries that affect the underlying trend in the already published scenario;

identifying at least a change driver from the trend papers content, wherein the change driver acts as a derivative force on the underlying trend;

developing, via a computer processing device, a third set of Internet search queries designed to locate change driver papers on the Internet, wherein the change driver papers provide information pertaining to the derivative effect of the change driver on the underlying trends of both the treasury products and the external industries;

executing, continuously, the third set of Internet search queries designed to locate on the Internet information about the change driver and flagging the third set of Internet search queries that return the most new content about the change driver;

generating a report that lists the flagged the third set of Internet search queries, publishing to a community of stakeholders information about the change driver;

receiving from the community of stakeholders feedback regarding how the change driver will affect the topic in the future;

monitoring, via a computer processing device, the feedback regarding how the change driver will affect the topic in the future and highlighting content that differs from the information obtained from the Internet about the change driver; and providing a forum through which the community of stakeholders develop the community-generated scenario around the highlighted content.

12. The method of claim 11, further comprising:

publishing to a community of stakeholders the report that lists the flagged Internet search queries.

13. The method of claim 12, further comprising:

creating a webpage for the change driver; and instructing the community of stakeholders to complete the webpage with information about the new content associated with the flagged Internet search queries.

14. The method of claim 13, further comprising:

publishing to the community of stakeholders information about the trend.

15. The method of claim 14, further comprising:

creating a webpage for the particular topic;

instructing the community of stakeholders to complete a trend section of the webpage with information about how the trend will shape the future of the particular topic; and prompting the community of stakeholders to complete a change driver section of the webpage with information about how the change driver will shape the future of the topic.

16. A computer program product for creating a scenario about the future of a topic, the computer program product comprising at least one non-transitory computer-readable medium having computer-executable instructions embodied therein, said computer-executable instructions comprising:

first instructions configured to continuously scan the Internet for at least an already-published scenario about the future of the topic, wherein at least a portion of the topic includes treasury products or services;

second instructions configured to identify at least an underlying trend in the already published scenario, wherein the underlying trend causes the already published scenario to take place;

third instructions configured to develop a second scan of the underlying trend in the already published scenario using the Internet, wherein the second scan obtains trend papers from the Internet associated with both treasury products related to the published scenario and trend papers related to external industries that affect the underlying trend in the already published scenario;

fourth instructions configured to identify at least a change driver from the trend papers content, wherein the change driver acts as a derivative force on the underlying trend fifth instructions configured to develop a third scan of the Internet wherein the third scan identifies change driver papers that are directed to the identified change drivers, wherein the change driver papers provide information pertaining to the derivative effect of the change driver on the underlying trends of both the treasury products and the external industries;

sixth instructions configured to publish to a community of stakeholders the information about the change driver;

seventh instructions configured to receive from the community of stakeholders feedback regarding how the change driver will affect the topic in the future; and eighth instructions configured to monitor the feedback regarding how the change driver will affect the topic in the future and highlighting content that differs from the information obtained from the Internet about the change driver.

17. The computer program product of claim 16, wherein the first instructions configured to scan the Internet for at least an already-published scenario about the future of the topic comprise:

instructions configured to develop a set of search queries that searches the Internet for the published scenario about the topic; and instructions configured to routinely execute Internet searches using the set of search queries.

18. The computer program product of claim 16, wherein the second instructions configured to identify at least an underlying trend in the already-published scenario further comprise:

instructions configured to read the text of the scenario and identify keywords or keyword combinations.

19. The computer program product of claim 16, wherein the third instructions configured to obtain from the Internet information about the underlying trend comprise:

instructions configured to develop a set of search queries that searches the Internet for trend papers associated with the treasury products that relate to the published scenario; and instructions configured to develop a second set of search queries that searches the Internet for trend papers related to the external industries that affect the underlying trend in the already published scenario; and instructions configured to routinely execute Internet searches using the two sets of search queries.

20. The computer program product of claim 16, wherein the third instructions configured to allow for identification of at least the change driver that drives the trend comprise:

instructions configured to read the text of the information and identify keywords or keyword combinations.

21. The computer program product of claim 16, wherein the fifth instructions configured to develop a third scan of the Internet to obtain change driver papers that contain information pertaining to the derivative effect of the change driver on the underlying trend comprise;

instructions configured to develop a set of search queries that searches the Internet for change driver papers that contain information about the derivative effect of the change driver on the underlying trend associated with the treasury products; and instructions configured to develop a set of search queries that searches the Internet for change driver papers that contain information about the derivative effect of the change driver on the underlying trend associated with the external industries; and instructions configured to routinely execute Internet searches using the two sets of search queries.

22. The computer program product of claim 16, wherein the seventh instructions configured to receive from the community of stakeholders feedback regarding how the change driver will affect the topic in the future comprise:

instructions configured to create a webpage for the change driver; and instructions configured to instruct the community of stakeholders to fill the webpage with information about the relevance of the change driver to the topic, the impact that the change driver has had and will have on the topic, and the likelihood that the change driver will drive the topic going forward.

23. The computer program product of claim 16, wherein ninth instructions configured to provide the forum through which the community of stakeholders can develop the community-generated scenario around the highlighted content comprise:

instructions configured to create a webpage for the topic;

instructions configured to instruct the community of stakeholders fill out a trend section of the webpage with information about how the underlying trend will shape the future of the topic; and instructions configured to instruct the community of stakeholders fill out a change driver section of the webpage with information about how the change driver will shape the future of the topic.

24. A system for creating a community-generated scenario that provides a description of the future of a topic, the system comprising:

a memory apparatus;

an input apparatus, wherein the input apparatus is configured to receive a request to create the community-generated scenario for the topic; and a processing apparatus configured to:

scan the Internet continuously for at least an already-published scenario about the future of the topic, wherein at least a portion of the topic includes treasury products or services;

identify at least an underlying trend in the already-published scenario, wherein the underlying trend causes the already published scenario to take place;

developing a second scan of the underlying trend in the already published scenario using the Internet, wherein the second scan identifies trend papers associated with both treasury products related to the published scenario and trend papers related to external industries that affect the underlying trend in the already published scenario;

develop a third scan of the Internet, wherein the third scan identifies change driver papers containing information about the derivative effect of the change driver on the underlying trend;

publish to a community of stakeholders the information about the change driver;

receive from the community of stakeholders feedback regarding how the change driver will affect the topic in the future;

monitor the feedback regarding how the change driver will affect the topic in the future and highlighting content that differs from the information obtained from the Internet about the change driver; and provide a forum through which the community of stakeholders develop the community-generated scenario around the highlighted content.

25. The system of claim 24, wherein the processing apparatus is configured to scan the Internet for at least an already-published scenario about the future of the topic by:

developing a set of search queries that searches the Internet for the published scenario about the topic; and routinely executing Internet searches using the set of search queries.

26. The system of claim 24, wherein the processing apparatus is further configured to identify at least an underlying trend in the already-published scenario by:

reading the text of the scenario and identifying keywords or keyword combinations.

27. The system of claim 24, wherein the processing apparatus is configured to develop a second scan of the Internet to obtain information about the underlying trend by:

developing a set of search queries that searches the Internet for trend papers associated with the treasury products that relate to the published scenario;

developing a second set of search queries that searches the Internet for trend papers related to the external industries that affect the underlying trend in the already published scenario; and routinely executes Internet searches using two sets of search queries.

28. The system of claim 24, wherein the processing apparatus is configured to identify the change driver that drives the trend by:

reading the text of the information and identify keywords or keyword combinations.

29. The system of claim 24, wherein the processing apparatus is configured to develop a third scan of the Internet to obtain information about the derivative effect of the change driver on the underlying trend by:

developing a set of search queries that searches the Internet for change driver papers that contain information about the derivative effect of the change driver on the underlying trend associated with the treasury products;

developing a second set of search queries that searches the Internet for change driver papers that contain information about the derivative effect of the change driver on the underlying trend associated with the external industries; and routinely executing Internet searches using the two sets of search queries.

30. The system of claim 24, wherein the input apparatus is configured to receive from the community of stakeholders feedback regarding how the change driver will affect the topic in the future by:

creating a webpage for the change driver; and instructing the community of stakeholders fill the webpage with information about the relevance of the change driver to the topic, the impact that the change driver has had and will have on the topic, and the likelihood that the change driver will drive the topic going forward.

31. The system of claim 24, wherein the processing apparatus is configured to provide the forum through which the community of stakeholders can develop the community-generated scenario around the highlighted content by:

creating a webpage for the topic;

instructing the community of stakeholders to fill out a trend section of the webpage with information about how the underlying trend will shape the future of the topic; and instructing the community of stakeholders to fill out a change driver section of the webpage with information about how the change driver will shape the future of the topic.

* * * * *